United States Patent Office

3,266,907
Patented August 16, 1966

3,266,907
PREPARATION OF WHIPPABLE COMPOSITIONS
Robert F. Kozlik and James L. Swanson, Minneapolis, Minn., assignors to General Mills, Inc., a corporation of Delaware
No Drawing. Filed June 25, 1962, Ser. No. 205,079
3 Claims. (Cl. 99—139)

The present invention relates to a process for preparing a whippable composition. More particularly, it relates to a process for preparing a composition which can be whipped to provide a dessert topping or icing for cakes and the like.

Powdered compositions for use in preparing whipped toppings are known. Such materials offer the advantage of ease of handling due to their free flowing character and freedom from spoilage on storage for long periods of time due primarily to their low moisture content. However, most of these compositions have not enjoyed much commercial success because they are not readily whipped and perform in an inconsistent manner. For example a paste emulsion of skim milk solids, fat, sucrose, and a mixture of mono- and diglycerides, while readily whipped when added to whole milk, has been found to be virtually unusable when dried. In the dried form an excessive whipping period is required even when a mechanical beater is employed. Some improvements in whippability apparently can be obtained by substituting a water soluble protein such as sodium caseinate for the milk solids, but the overrun on whipping is usually low, the texture heavy and pasty, and the after-taste or mouth feel greasy.

It has recently been proposed to prepare whippable compositions by drying an emulsion of a fat and a partial ester of an edible glycol and a higher saturated fatty acid in a matrix of hydrophilic encapsulating solids selected from proteinaceous materials and mixtures of proteinaceous and carbohydrate materials. While such products function satisfactorily as to whippability, their preparation involves several steps including blending of the ingredients, preparation of an emulsion and drying of the prepared emulsion by such methods as spray-drying. It would be highly desirable to be able to prepare whippable compositions without having to first emulsify the ingredients and then dry the resulting emulsion by spray-drying, for example.

Therefore, it is an object of the present invention to provide a simplified method of preparing whippable compositions.

Another object of the invention is to provide such a method which eliminates the necessity of forming and drying an emulsion of the ingredients.

These and other objects will become apparent from the following detailed discussion.

We have now discovered that whippable compositions can be prepared by plasticizing a mixture of shortening and emulsifier and then intensively blending the plasticized composition with sugar, a proteinaceous material and optionally other ingredients such as flavoring agents, dyes and the like. The compositions so prepared are easily and readily whipped to provide toppings or icings having excellent volume, spreadability, texture and eating properties.

The shortening can be any of those commonly employed in food products. Thus any combination of edible oils, semi-solid or solid fats can be employed. Such shortening materials can be partially or fully hydrogenated. Examples of suitable shortenings include: lard, modified lard, butter, margarine, and various animal and vegetable oils. Representative of the latter are coconut oil, palm kernel oil, cottonseed oil, peanut oil, olive oil, sunflower seed oil, sesame seed oil, corn oil, safflower oil, poppyseed oil, soybean oil and the like. Preferably, the shortening is an oil or a low melting fat.

An emulsifier is also used in the process of the present invention. Representative of such compounds are mono- and diglycerides of fat forming fatty acids, such as mono- and diolein, monostearin, and dipalmitin; polyoxyalkylene ethers of fatty esters of polyhydric alcohols, such as the polyoxyethylene ethers of sorbitan monostearate or the polyoxyethylene ethers of sorbitan distearate; mono- and diesters of glycols and fatty acids such as propylene glycol monostearate; and partial esters of carboxylic acids such as lactic, citric, and tartaric acids with the mono- and diglycerides of fatty acids, such as glyceryl lactopalmitate. The fatty acids used to prepare the above emulsifiers include those derived from beef tallow and castor, coconut, cottonseed, mustard seed, palm, peanut, rapeseed, rice bran, soybean, tall and marine oils. A preferred emulsifier is glyceryl lactopalmitate.

Suitable sugars for use in the invention include any of the commonly used granular sugars, including sucrose, dextrose, maltose, fructose, lactose and brown and invert sugars as well as mixtures of said sugars. Such sugars can also be used in powdered form. Corn syrup solids can be employed when it is desired to produce toppings having reduced sweetness.

A wide variety of proteinaceous materials can be employed. Representative thereof are non-fat milk solids, whey solids, water soluble soy protein derivatives, egg albumen, dried cream cheese, gelatin and sodium caseinate. The protein stabilizes the topping or icing prepared from the whippable composition and is preferably sodium caseinate.

The whippable compositions prepared by our process can also contain other ingredients such as flavoring agents, dyes or colorants, lecithin or hydroxy lecithin, citric acid, fumaric acid, vitamins, minerals and the like. Suitable flavoring agents include fruit flavors, chocolate, caramel, mint, butter, maple, spice, vanilla, and the like. The lecithin compound is used to increase the volume of the topping or icing. Such compounds are preferably used in the form of a dry mix (40%) on non-fat milk solids. Citric acid and fumaric acid also increase the volume of the toppings. Salts, vitamins and minerals can be included to increase the flavor and/or nutritional value of the toppings.

The amounts of the above-described ingredients can be varied over relatively wide limits. For example, the sugar is used in an amount sufficient to provide the desired sweetness level to the ultimate topping or icing. Likewise, the amount of the shortening will be sufficient to provide a stable topping which has good mouth feel but yet is not greasy. Also, the emulsifier and porteinaceous material will be used in amounts sufficient to give good whipping properties to the whippable composition and to stabilize the topping, respectively. A preferred range of ingredients is as follows.

| Ingredients: | Percent by weight |
|---|---|
| Shortening | 5.0–15.0 |
| Emulsifier | 3.0–10.0 |
| Sugar | 45.0–85.0 |
| Proteinaceous material | 2.0–6.0 |
| Flavoring agents | 0.0–20.0 |
| Lecithin compound | 0.0–1.5 |
| Citric acid or fumaric acid | 0.0–0.6 |
| Vitamins, minerals | 0.0–5.0 |
| Dyes or colorants | 0.0–2.0 |

Especially good results are obtained when the lecithin compound and citric acid or fumaric acid are included in amounts of 0.2–1.5% and 0.05–0.2%, respectively.

As indicated above, the shortening and emulsifier are first plasticized according to our process. Such plasticizing can be accomplished using a scraped-surface heat exchanger such as a Votator or the like. By plasticizing is meant that the shortening and emulsifier are agitated, preferably with heating, to form a homogeneous mass and then passed through a scraped-surface heat exchanger where the mass is cooled and the proper or fine crystal structure obtained. The amount of heating, cooling and agitation will vary considerably depending upon the particular shortening and emulsifier used and the particular device employed. Plasticizing of oils and various emulsifiers may be effected without heating, for example, while solid shortenings and emulsifiers would require some heating.

After the described plasticizing step, the plasticized composition is intensively blended with the sugar, proteinaceous material and optionally other ingredients. By intensive blending is meant that the plasticized composition is vigorously agitated with the sugar and proteinaceous material (also the flavoring agents and the like) so that substantially all of the sugar and proteinaceous material particles are smeared with the plasticized composition or have a film thereof on at least a portion of said particles. The intensive blending is substantially a mixing operation with relatively little crushing of the particles occurring. Such intensive blending can be accomplished using a variety of well known and commercially available blending devices. Examples thereof are cake mix finishers, Fitzmills, Turbulizers and the like. The conditions under which the intensive blending step is carried out can vary over relatively wide ranges. The only limitation is that the final composition must be readily and easily whipped. The temperature of the ingredients during said step is preferably kept below about 100° F.

It is important that the intensive blending step be carried out while the shortening and emulsifier are still in the plasticized, homogeneous state. Thus, when using an oil, for example, the plasticized composition should be blended with the other ingredients within about 12 hours, and preferably within one hour after the plasticizing is completed. If the emulsifier is completely soluble in the liquid oil, a considerably longer period of time may elapse before the intensive blending step. When using a solid shortening, the blending should be accomplished before the plasticized composition hardens to any significant degree, and preferably within about one hour after the plasticization step. Obviously, the time between the plasticizing and intensive blending steps will vary depending on the particular shortening and emulsifier used. It is only necessary that there be no significant separation of the emulsifier from the plasticized composition.

The following examples serve to illustrate the present invention without, however, limiting the same thereto.

*Example I*

A white, vanilla flavored whippable composition was prepared from the following ingredients.

Ingredients: Percent by weight
Sucrose _____ 51.4
Corn syrup solids _____ 30.0
Margarine oil (lightly hydrogenated blend of cottonseed oil and soybean oil) _____ 9.0
Glyceryl lactopalmitate _____ 5.0
Sodium caseinate _____ 3.0
Lecithin (40% by wt. on non-fat milk solids)__ 0.8
Vanilla powder _____ 0.4
Salt _____ 0.3
Burnt almond flavor _____ 0.1

The glyceryl lactopalmitate and margarine oil were melted by heating a mixture thereof to 140° F. The resulting fluid mixture was then pumped through a Votator at a rate of approximately 2 lbs./min. The Votator consisted of an "A" unit having a 4 inch diameter and an 18 inch "B" unit having a 3 inch diameter. Both units were operated at 300 r.p.m.'s under a back pressure of 300 p.s.i. As the mixture of glyceryl lactopalmitate and margarine oil passed through the Votator, it was cooled to 65° F. and changed to a plastic mass having fine crystal structure. Within about 30 minutes, the plasticized composition was intensively blended with the remaining ingredients by two passes of the whole composition through a cake mix finisher (7 blades revolving at 3000 r.p.m.). The resulting whippable composition consisted of an intimately blended composition of relatively fine particle size. Substantially all of the sugar and sodium caseinate particles had a film of oil on at least part of the surface thereof.

Six ounces of the whippable composition were mixed with six ounces of water and whipped at high speed on a mechanical mixer. After about 2½–3½ minutes, the whipped topping reached a density of approximately 0.40 g./cc. The finished topping was firm enough to stand in peaks and when spread on cake, provided a delicious icing which was very stable, did not dry out and which had excellent mouth feel and eating properties.

An equally delicious topping can be prepared by replacing the water with six ounces of milk.

*Examples II and III*

Whippable compositions having chocolate and caramel flavors are prepared by plasticizing and intensively blending the following ingredients by the same procedure as set forth in Example I:

| Ingredients | Percent by weight | |
|---|---|---|
| | Example II | Example III |
| Sucrose | 69.4 | 63.4 |
| Margarine oil (See Example I) | 9.0 | 9.0 |
| Glyceryl lactopalmitate | 5.0 | 5.0 |
| Sodium caseinate | 3.0 | 3.0 |
| Cocoa | 12.0 | |
| Butterscotch flavor | | 9.0 |
| Caramel flavor | | 9.0 |
| Lecithin (See Example I) | 0.8 | 0.8 |
| Vanilla powder | 0.4 | 0.4 |
| Salt | 0.3 | 0.3 |
| Citric acid | 0.1 | 0.1 |

The whippable compositions give excellent icings when six ounces of the respective compositions are blended and whipped with six ounces of water or milk.

The process of the present invention, as illustrated by the above examples, provides a simplified method for preparing highly suitable whippable compositions. No emulsion need be formed and no spray drying step is required. The whippable compositions so prepared can be used to prepare toppings or icings for a wide variety of products including cakes, pies, rolls, puddings and the like.

It is to be understood that the invention is not to be limited to the exact details of operation or the exact processes and compositions shown or described, as obvious modifications will be apparent to those skilled in the art and the invention is to be limited only by the scope of the appended claims.

The embodiments of the invention in which an exclusive property or privilege is claimed are defined as follows:

1. The process of making a dry whippable composition for use in the preparation of dessert toppings and icings from a mixture consisting of 5 to 15 parts shortening, 3 to 10 parts emulsifier, 45 to 85 parts sugar, 2 to 6 parts proteinaceous material, 0 to 20 parts flavoring agents, 0 to 1.5 parts lecithin compound, 0 to 0.6 part citric acid and 0 to 2.0 parts dye which comprises: (1) agitating the shortening and emulsifier to form a homogeneous mass; (2) passing the resulting mass through a scraped-surface heat exchanger to obtain a plastic mass having a fine crystal structure; and (3) intensively blending the resulting plastic mass with the sugar, proteinaceous material, flavoring agents, lecithin compound, citric acid and dye so that substantially all of the sugar and proteinaceous material particles are smeared with the plastic mass to produce the dry whippable composition without further treatment.

2. The process of claim 1 wherein the emulsifier is glyceryl lactopalmitate and the proteinaceous material is sodium caseinate.

3. The process of claim 1 wherein the shortening is selected from the group consisting of oils and low melting fats.

References Cited by the Examiner
UNITED STATES PATENTS

| | | | |
|---|---|---|---|
| 2,598,282 | 5/1952 | Melnick | 99—139 |
| 2,619,422 | 11/1952 | Diamond | 99—139 |
| 2,619,423 | 11/1952 | Diamond | 99—139 X |
| 2,846,314 | 8/1958 | Aichele et al. | 99—139 |
| 2,913,342 | 11/1959 | Cameron et al. | 99—139 X |
| 2,918,375 | 12/1959 | Gibsen | 99—139 X |
| 3,051,577 | 8/1962 | Babayan et al. | 99—139 X |
| 3,098,748 | 7/1963 | Noznick et al. | 99—139 |

OTHER REFERENCES

Jacobs: "The Chemistry and Technology of Food and Food Products," 1951, Interscience Publishers, Inc., New York, vol. III, pp. 2339–2340 (1951).

A. LOUIS MONACELL, *Primary Examiner.*

BEATRICE H. STRIZAK, *Examiner*

JOSEPH M. GOLIAN, *Assistant Examiner.*